PROCESS FOR THE PRODUCTION OF A MAGNETIC RECORD MEMBER

Filed Nov. 4, 1970

INVENTORS
GORO AKASHI
MASAAKI FUJIYAMA
AKIRA KASUGA
YASUYUKI YAMADA
OSAMU SUZUKI
MATSUAKI NAKAMURA
KENJI SEGA
HIROSHI KATO

BY Sughrue, Rothwell, Mion, Zinn & Macpeak ATTORNEYS 3,794,519

PROCESS FOR THE PRODUCTION OF A MAGNETIC RECORD MEMBER

Goro Akashi, Masaaki Fujiyama, Akira Kasuga, Yasuyuki Yamada, Osamu Suzuki, Matsuaki Nakamura, Kenji Sega, and Hiroshi Kato, Kanagawa, Japan, assignors to Fuji Photo Film Co., Ltd., Kanagawa, Japan Filed Nov. 4, 1970, Ser. No. 86,924
Claims priority, application Japan, Nov. 4, 1969, 44/88,272
Int. Cl. H01f *10/02*
U.S. Cl. 117—235 6 Claims

ABSTRACT OF THE DISCLOSURE

A method for preparing a magnetic record member free from sulfate ($SO_4^{--}$) and chloride ($Cl^-$) ions, which comprises: (a) reacting an iron salt to form goethite powder, (b) heating said goethite, thus converting it to magnetite or $\gamma$-hematite, (c) washing the resulting matter of (b) with an aqueous solvent to remove any water-soluble impurities therefrom, (d) dispersing the purified product so obtained in a solution of film-forming resin and (e) applying said dispersion to a suitable backing receptive to a magnetic recording layer, and the product so obtained.

BACKGROUND OF THE INVENTION

The present invention relates to a process for the production of a magnetic record member, such as a magnetic tape, sheet, disc or card for the purpose of magnetic recording and, in particular, sound recording, image recording, or memorization.

In the past, known magnetic record members have been generally prepared by the steps of dispersing magnetic powders (e.g., iron oxide, magnetic alloys, chromium dioxide, and the like) into film-forming synthetic resin binders (e. g., nitrocellulose, vinyl acetate resins, vinyl chloride-vinyl acetate copolymer resins, epoxy resins, polyurethane resins, acrylic resins, vinylidene chloride resins, melamine resins and the like) and applying the dispersion to a backing, such as a synthetic resin film, paper or metal.

In the case of recording signals on these magnetic record members and re-recording said record, the known magnetic recorders require contact with a magnetic head of the apparatus as well as with the surface of said magnetic record member followed by a sliding thereon. Furthermore, in a tape type magnetic record member, the running of said record member from a feed reel to a winding reel through the magnetic head is usually effected by supporting it on a guide pole or a guide roller which is equipped properly on the apparatus. Any type magnetic recorder plays through a contacting thereof with the magnetic head or the guide pole. Hence, an often encountered phenomenon occurs when a bruised piece of magnetic layer is scattered in a powder, due to the abrasion caused by contacting therewith. This powder adheres and collects onto the guide roller and the magnetic head, which invariably leads to undesirable defects, such as impossibility or the dropout of the reading out signal when re-recording the record on the magnetic record member. In this case, the efficiency of the magnetic record member is extremely diminished. Recently, the demand for a magnetic recorder having a long life and remaining durable for continuous operation over 1,000 hours in high density has been increased. The system thereof must be improved so as to decrease adhesion of the abrasion piece of said magnetic layer to the magnetic head for the purpose of satisfying such commercial requirements.

SUMMARY OF THE INVENTION

It is, therefore, the primary object of the present invention to provide a magnetic recorder member which will continuously perform over an extended length of time as well as in high density and, yet, not become defective in the manner as described above.

It is another object of the present invention to provide a practical process for the production of magnetic record members by combination of a specific refining treatment which contemplates the employment of water or water-soluble solvents to separate out the water-soluble impurities, e.g., NaCl, $NaHSO_4$, $Na_2SO_4$, etc., therefrom prior to the preparation of a coating composition for the magnetic recording layer.

Accordingly, as a result of many studies on breaking of the magnetic layer caused by the aforementioned defects, the present inventors have discovered that this phenomenon may be enhanced by incorporating components having ions, such as chloride and sulfate (hereafter noted as "$Cl^-$" and "$SO_4^{--}$," respectively), in the magnetic layer. Results will also depend on the hardness of the magnetic layer as well. Hence, the present inventors have discovered a method of removing the defect causing components having ions, such as $Cl^-$ and $SO_4^{--}$, from the composition of the magnetic layer.

DETAILED DESCRIPTION OF THE INVENTION

A cause for the presence of the $Cl^-$ and $SO_4^{--}$ ions in the magnetic layer is mainly due to the process utilized in producing $\gamma$-$Fe_2O_3$.

That is to say, since the major raw material for the general process of producing $\gamma$-$Fe_2O_3$ is ferrous sulfate or ferrous chloride and caustic soda, there are naturally present $SO_4^{--}$ and $Cl^-$ ions in the reactant after the reaction is complete.

For example, $SO_4^{--}$ is present in the form of $Na_2SO_4$ in preparing $FeSO_4 \cdot 7H_2O$ as the raw material. The removal of $Na_2SO_4$ has, therefore, been perfected by washing a goethite, obtained in the reaction, sufficiently with water. Prior to this, the method of removing $SO_4^{--}$ has been carried out by a method comprising washing out completely the reactant with water and heating goethite or $\gamma$-$Fe_2O_3$ from 600° C. to 800° C. over one hour in air to set free the $SO_4^{--}$ ion in the form of gases, such as $SO_3$ and $SO_2$. See, for instance, Japanese patent publication No. 11,733/65.* However, our studies have shown that these methods have proved insufficient in the removal of the $SO_4^{--}$ ion. In particular, the latter brings inferior results in the magnetism of the so obtained magnetic powder. This is especially true with respect to the deterioration of the squareness ratio and decrease of anti-magnetization due to variation of shape in the needle crystal. Sintering between the particles following heating the reactant over one hour at temperatures over 600° C. as well as the defects previously mentioned can easily be observed by means of an electron microscope of 5,000 magnifications.

The present inventors have made numerous studies, in attempting to obviate the foregoing defects and as the result, herein attained the present invention.

Accordingly, the present invention provides a practical and useful process for the production of a magnetic recording member which comprises the steps of (a) reacting an iron salt to form goethite powder, (b) heating the reactant to convert said goethite into magnetite or $\gamma$-hematite (magnetic powder), (c) washing the so treated matter with an aqueous solvent to separate out the water-soluble components (impurities) from the so treated mat-

*Japanese Pat. No. 458,290.

ter, (d) dispersing the so obtained magnetic powder in a solution containing a film-forming resin, and (e) applying said solution to a backing to form a magnetic recording layer thereon.

The typical examples of the iron salts contemplated for use in the present invention include ferrous sulfate (heptahydrate), ferrous chloride, ferrous sulfate (monohydrate), ferric sulfate, ferric chloride, and the like. The reaction of these iron salts results in a crystalline powder having the general formula: $\gamma$-FeOOH. According to the present invention, it may be obtained as a powder of needle-like crystals ranging from one micron or less in length, depending on the procedure and the conditions employed as demonstrated more particularly, in U.S. Pat. No. 2,694,656.

The reactant in the foregoing procedure, goethite powder, is subsequently heated to convert it into magnetite or $\gamma$-hematite. In this case, the heat treatment is also conducted under the same conditions as set forth in the foregoing United States patent mentioned above.

An essential step in the process of the present invention is the procedure of washing the reactant with water or water-soluble solvents, such as methanol, ethanol, propanol, acetone, and the like to separate out the various water-soluble components, such as NaCl, $NaHSO_4$, $Na_2SO_4$, etc., from the so treated matter.

In the past, whereas the process employed for producing the magnetic powder was by reaction of an iron salt with an alkali as the starting material, the present invention provides a water-washing step for the purpose of washing out the undesirable $Na_2SO_4$ after preparing the goethite powder. The residual component containing still a greater quantity of $SO_4^{--}$ and $Cl^-$ ions as impurities in the powder thus washed, leads often to corrosion of the magnetic head at a high temperature and moisture. Therefore, in order to effectively prevent corrosion of the magnetic head, employment of a refining step according to the present invention, subsequent to the steps of reduction and oxidation, is desired. In this manner, the defects previously discussed may be prevented.

A cause for the impossibility in washing out all of the $Na_2SO_4$ from the reactant in the foregoing water-washing step is due to the fact that the formation of crystals containing $Na_2SO_4$ therein, adheres to the surface of the goethite crystals when precipitated. These crystals then grow in the reaction solution via reaction of the iron salt with the alkali. Accordingly, in the water-washing step previously practiced, only the $Na_2SO_4$ attached to the crystal surface is washed out without removal of any residual $Na_2SO_4$ remaining in the crystal. When this crystal is subsequently calcined after the reduction and the oxidation thereof, the magnetic particles remain only in the skeleton. Upon releasing water of crystallization, the $Na_2SO_4$ contained therein is drawn to the surface of the skeleton particle and now influences and detracts from the preparation of the coating composition, as previously discussed.

Hence, the clearing treatment, in the process of the present invention, prior to the preparation of said coating composition is extremely important.

According to the present invention, corrosion of the magnetic head is caused not only by $Na_2SO_4$ and NaCl but also by any electrolyte in a similar state. Furthermore, the adsorption of impurities contained in the reducing or oxidizing gas of the reactant should also be cared for in achieving success. The important aspect of the present invention is to effect clearing up of the water-, alcohol- and acetone-soluble impurities in addition to removal of the $Na_2SO_4$ and the NaCl from the powder when employing an aqueous solvent, such as a water-alcohol mixture, a water-acetone mixture, and the like. At this time, the practice of washing may generally be carried out by filtration or decantation, which comprises supplying water from the bottom of a vessel and overflowing from the upper portion. Enhancing the washing treatment may be achieved by such operations as elevation of the liquor temperature, ultra-sonic wave, mechanical vibrations, stirring, shearing, comminuting and crushing to fine powder.

The washed magnetite powder or $\gamma$-hematite powder is dispersed in, for example, an organic solvent solution of a film-forming synthetic resin, together with a lubricant, a surfactant, and an auxiliary dispersant, etc. In this manner, it may be applied to various synthetic resin films, such as cellulose diacetate, cellulose triacetate, polyethylene terephthalate, polyvinyl chloride resins, and the like. If necessary, it may be oriented in a magnetic field and dried to form a magnetic recording layer thereon. As the lubricant, there is contemplated silicon resin oil, fluorine containing resin oils, stearic acid and ester waxes, such as butyl stearate. On the other hand, the surfactant employed may comprise any non-ionic or anionic surfactant as well as lecithin.

BRIEF DESCRIPTION OF THE DRAWINGS

In the accompanying drawings.

A better understanding of the present invention will be attained from the following examples, which are merely illustrative and not limitative of the present invention. All parts are by weight unless otherwise stated.

Comparative Example 1

Three kinds of goethites (non-magnetic ferrous oxide ($Fe_2O_3 \cdot H_2O$) were prepared by reacting ferric sulfate ($FeSO_4 \cdot 7H_2O$) with caustic soda (NaOH). The products so obtained were crude goethites containing iron sulfate as impurities, even after a thorough washing thereof with water. However, they differed individually in the content of the impurities which were confirmed to be $Na_2SO_4$, although the same goethite was present as the major component. The amount of $Na_2SO_4$ by weight of the crude goethite was as follows:

| | Percent by weight |
|---|---|
| Sample 1 | 0.6 |
| Sample 2 | 0.7 |
| Sample 3 | 0.95 |

These crude goethites were subsequently heated under the same conditions, i.e., 300° to 400° C., in order to dehydrate and then reduce via introduction of $H_2$ gas in a vessel. They were then further oxidized with $O_2$ gas to form $\gamma$-$Fe_2O_3$. The so obtained $\gamma$-$Fe_2O_3$ exhibited a strong magnetization. From these, $\gamma$-$Fe_2O_3$ dispersions, having the following composition, were prepared:

| | Parts |
|---|---|
| Magnetic powder ($\gamma$-$Fe_2O_3$) | 100 |
| Vinyl chloride-vinyl acetate copolymer (binder) (molar ratio 87:13) | 23 |
| Linseed oil (lubricant and dispersant for the magnetic powder) | 1 |
| Anionic surfactant (sulfuric ester of a higher alcohol) | 2 |
| Methyl ethyl ketone (solvent for binder) | 450 |

This coating composition was then applied to a polyester resin film having a thickness of 25$\mu$. The dried thickness of coating layer became about 12$\mu$, and was subjected to a polishing treatment of the coating surface by means of a super calender. Subsequently, it was cut into a desirable width to obtain a magnetic recording tape. The evaluation of said magnetic recording tape was conducted in an atmosphere of 50° C. and relative humidity of 90% by means of an open reel type recorder having a stereo head.

For clarifying the effective difference, the tape was usually run from left to right direction at a running speed of 9.5 cm./sec.

Figure 1:
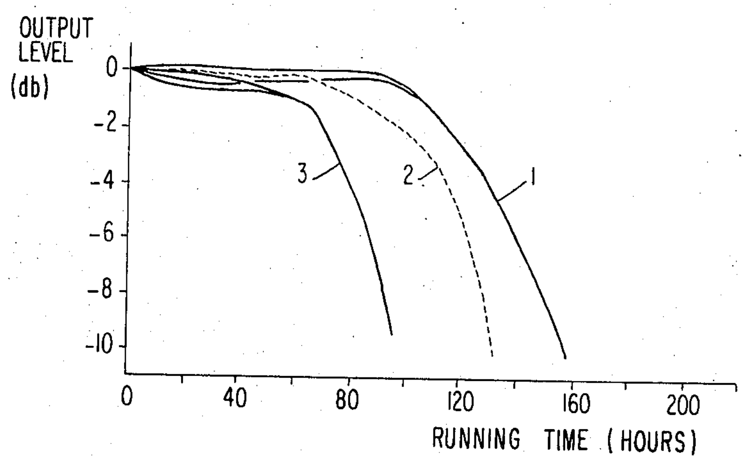
FIG. 1 is a curve for comparison with the effect of the present invention showing durability, and in particular, the relationship of the re-recording power level for the use time, versus the continuous use of a magnetic record member consisting of magnetic powders. This member was produced by a comparative example based on a known process of the prior art an compared with the present invention.

After recording, a re-recording was carried out. In this test, a dust (broken piece of the magnetic layer) separated from the magnetic layer adhered to the magnetic head on the running of said tape, and the quantity increased in proportion to the running time of the magnetic tape. Subsequently, the relationship between the lowering of power in the magnetic tape and the running time was measured As the result, the re-recording power level at 1 $KH_z$ was confirmed to be rapidly diminished after approximately 100 hours as shown in FIG. 1. After 130 hours, the surface of the magnetic head used for evaluating each of the tapes was observed by means of an optical microscope. The results exhibited marked powder presence on the head cap. Furthermore, when the magnetic head, after dissolution of the magnetic powder with a solvent, was observed, corrosion was seen at the portion covering the shield plate in the head cap. The corrosive quantity, adhesion of the magetic layer's powder, and lowering degree of the powder were in a proportional relationship.

In results attained from closely examining the cause of said corrosion, it was clear that the corrosion was influenced by the presence of a component containing the $SO_4^{--}$ ion. Moreover, from the extremely close correspondence in the relationship between the quantity of $SO_4^{--}$ ion and the three kinds of the samples employed, it was proven that the quantity of $SO_4^{--}$ ion increased in accordance with the rapid lowering of the powder level in the sample employed. In addition, the foregoing fact was confirmed, even in the other examples, with the presence of iron chloride, instead of iron sulfate.

Example 1

A needle-like goethite, obtained by reacting iron sulfate with alkali in the same manner as the comparative example, was washed with water in a conventional way to remove $Na_2SO_4$ and other impurities. It was then dried and thereafter subjected to heating reduction and oxidation thereof. The $\gamma$-$Fe_2O_3$ obtained was then washed with warm water and kept at between 90° C. and 100° C. for about 5 hours. The initial pH of the warm water exhausted was strongly acidic and ranged from 1.8 to 3.0. It was confirmed from the foregoing fact that a considerably high quantity of material containing $SO_4^{--}$ ion was present in the crude $\gamma$-$Fe_2O_3$. Thereafter, it was dried and prepared into a magnetic tape in accordance with the same procedure as employed in the comparative example.

Figure 2:
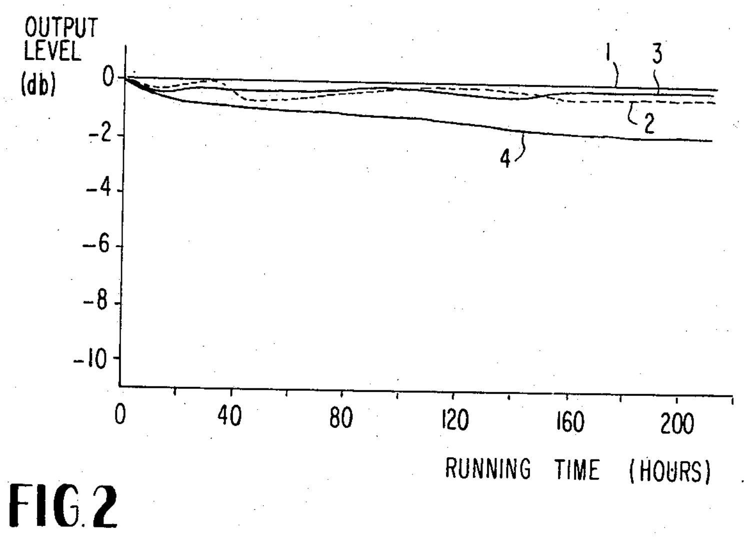
FIG. 2 is a curve showing the same relationship with respect to the magnetic record member consisting of magnetic powder produced in an example according to the present invention.

Upon evaluation of the magnetic tape, tests were con ducted in the same manner as employed in the comparative example. The result was excellent as shown by curve-1 in FIG. 2. The magnetic tape obtained in the comparative example lowered markedly the power, after approximately 100 hours. To the contrary, the one in the present example lacked adhesion of the powder in the magnetic layer, even from the microscopic observation of the magnetic head after 200 hours running. Likewise, no corrosion of the head was observed after removal of trace quantities of powder from the magnetic layer adhered to the head, with the solvent, methyl-ethyl ketone.

Example 2

A magnetic recording tape was produced in a procedure similar to Example 1. In this case, the warm waterwashing treatment thereof for refining $\gamma$-$Fe_2O_3$ was carried out using water at 18° C. and applied to 2 kw. of ultrasonic wave at 20 $KH_z$ during the treatment. The initial temperature of the water was 18° C., but was finally elevated to 55° C., due to the influence of the ultrasonic wave. The pH value was 2.3. Subsequently, this operation was repeated for 5 hours and, thereafter, treated in similar fashion as Example 1 to prepare a magnetic tape. The durability of the magnetic tape so obtained was evaluated according to the same manner as above and resulted in curve-2 in FIG. 2. As is clear from the foregoing examples and drawings, the results were excellent. Furthermore, no corrosion of the magnetic head was observed.

Example 3

A magnetic tape was produced in a procedure similar to Example 1. In this case, the refining of $\gamma$-$Fe_2O_3$ was carried out in warm water using a stirring dispenser (homoblender) rotating at about 10,000 r.p.m. for 3 hours. It was then washed with fresh water, dried and prepared into a magnetic tape. The durability of the so obtained magnetic tape was evaluated according to the same manner as indicated above. The results indicated a good effect as demonstrated by curve-3 in FIG. 2.

Example 4

When producing a goethite from ferrous chloride and caustic soda, there was a case where several percent of the cobalt chloride and manganese chloride were added thereto. However, the employment of the refining treatment according to the present invention made it possible to give curves close to curves 1 to 3 in FIG. 2. This was so, even in the case where metallic elements other than cobalt chloride and manganese chloride were present. After running for 200 hours, no corrosion of the magnetic head surface was observed.

On the other hand, in a tape made up of a magnetic element without the refining treatment according to the present invention, dust adhered markedly to the magnetic head.

Example 5

A goethite containing 4% of cobalt was washed with water, dried and reduced, without oxidation thereof, to form magnetic ferrous-ferric oxide ($Fe_3O_4$). After refining the so obtained product by a warm-washing treatment in the same procedure as in Example 1, good durability similar to the curves in FIG. 2 was obtained. Although there was observed a slight lowering in the durability, the adhesion of the magnetic powder to said magnetic head was diminished. No corrosion was observed.

As is clear from the results in the comparative example and the examples which follow, the present invention exhibits remarkable superiority in effect and durability of the magnetic recorder.

To reiterate, the present invention resides in the removal of chloride and sulfate ions from a goethite which is formed conventionally from an iron salt. In this manner, a magnetic recording member may be produced which performs over an extended length of time as well as in high density and yet, fails to exhibit any of the detrimental effects earlier discussed due to the presence of chloride and sulfate ions.

The method for preparing the magnetic recording member of the present invention may be summarized as follows:

(a) an iron salt is reacted to form goethite powder;
(b) the goethite is heated, thus converting it to magnetite or $\gamma$-hematite;
(c) the resulting matter of (b) is washed with an aqueous solvent to remove any water-soluble impurities therefrom;
(d) the product so obtained is dispersed in a solution of a film-forming resin; and
(e) the dispersion is applied to a suitable backing receptive to a magnetic recording layer.

Though there are no particular critical conditions applicable to the method of the present invention, the temperature of the water employed in the present invention is preferably of from 10 to 30° C. The clearing time will vary due to the variation in the particle form itself as well as the amount of powder employed.

Similarly, the amount of powder employed in preparing the record member is not critical. However, it is preferred that 50 to 200 g. of binder corresponding to 300 g. of powder be used. The solvent is added in order that the viscosity of the coating composition be in the range of from 500 to 10,000 cp. at 25° C.

In addition to the binders already mentioned, polyamide resins, butadiene-acrylonitrile copolymers, and silicon resins may also be employed.

Although the present invention has been adequately described in the foregoing specification and examples included therein, it is readily apparent that various modifications and changes may be made without departing from the scope thereof.

What is claimed is:

1. A method for preparing a magnetic record member free from water-soluble sulfate ($SO_4^{--}$) and chloride ($Cl^-$) ions, which comprises:

(a) reacting an iron salt selected from the group consisting of ferrous sulfate (heptahydrate), ferrous chloride, ferrous sulfate (monohydrate), ferric sulfate and ferric chloride to form goethite powder;

(b) heating said goethite, thus converting it to magnetite or $\gamma$-hematite;

(c) washing the resulting matter of (b) with an aqueous solvent to remove any water-soluble impurities therefrom;

(d) dispersing the purified product so obtained in a solution of a film-forming resin; and (e) applying said dispersion to a suitable backing receptive to a magnetic recording layer.

2. The method of claim 1, wherein the aqueous solvent is a member selected from the group consisting of methanol, ethanol, propanol, and acetone.

3. The method of claim 1, wherein the film-forming resin is a member selected from the group consisting of nitro-cellulose, vinyl acetate, a vinylchloride-vinyl acetate copolymer, epoxy resins, polyurethane, acrylic resins, vinylidene chloride and melamine.

4. The method of claim 1, wherein said backing is a member selected from the group consisting of a synthetic resin film, metal and paper.

5. The method of claim 1 further comprising as additional ingredients at least one member selected from the group consisting of a lubricant, surfactant and an auxiliary dispersant.

6. The method of claim 5, wherein the lubricant is a member selected from the group consisting of silicon resin oils, fluorine containing resin oils, stearic acid and butyl stearate.

References Cited

UNITED STATES PATENTS 2,694,656 11/1954 Camras ............ 117—235

WILLIAM D. MARTIN, Primary Examiner

B. D. PIANALTO, Assistant Examiner

U.S. Cl. X.R.

252—62.54